United States Patent [19]

Jakob et al.

[11] Patent Number: 5,535,098
[45] Date of Patent: Jul. 9, 1996

[54] ELECTRICAL DEVICE, PARTICULARLY SWITCHING AND CONTROL DEVICE FOR MOTOR VEHICLES

[75] Inventors: Gert Jakob, Stuttgart; Erwin Liegl, Eberdingen-Hochdorf; Siegbert Luz, Waiblingen-Neustadt; Gerd Bohmwetsch, Marbach; Martin Zywietz, Ludwigsburg, all of Germany

[73] Assignee: Robert Bosch GmbH, Stuttgart, Germany

[21] Appl. No.: 331,664

[22] PCT Filed: Apr. 15, 1994

[86] PCT No.: PCT/DE94/00416

§ 371 Date: Nov. 2, 1994

§ 102(e) Date: Nov. 2, 1994

[87] PCT Pub. No.: WO94/25310

PCT Pub. Date: Nov. 10, 1994

[30] Foreign Application Priority Data

Apr. 27, 1993 [DE] Germany .......................... 43 13 429.7

[51] Int. Cl.⁶ .................................................. H05K 5/00
[52] U.S. Cl. .......................... 361/752; 361/736; 361/796; 361/801; 174/50
[58] Field of Search ...................... 361/752, 796, 361/748, 801, 736, 784; 439/64, 65; 174/50; 257/678

[56] References Cited

U.S. PATENT DOCUMENTS 4,668,873   5/1987   Ohba et al. .................................. 307/9
5,268,820  12/1993   Tseng et al. ............................. 361/785

FOREIGN PATENT DOCUMENTS 9200624   1/1993   Germany .

*Primary Examiner*—Leo P. Picard
*Assistant Examiner*—Y. Whang
*Attorney, Agent, or Firm*—Michael J. Striker

[57] ABSTRACT

The electrical device essentially consists of three main components, the circuit board (10), the housing bottom (11) and the housing cover (12). These three main components are joined to one another in the area of their outer edge. For this purpose, the housing bottom (11) and the housing cover (12) have mounting and, respectively, support sections (18, 25) which essentially extend parallel to the circuit board surface. In order to keep the unusable zones for mounting and joining circuit board and the housing parts small, the longitudinal extent of the joints is very much smaller than the total length of the corresponding circuit board edges (FIG. 3).

12 Claims, 2 Drawing Sheets

{ # 5,535,098

ELECTRICAL DEVICE, PARTICULARLY SWITCHING AND CONTROL DEVICE FOR MOTOR VEHICLES

PRIOR ART

The invention is based on an electrical device, particularly a switching and control device for motor vehicles, of the generic type of the main claim. Such an electrical device is known, for example, from DE 92 00 624 U1, not previously published. Such devices are of very simple construction with respect to their mechanical structure and can therefore be inexpensively produced. The electrical device essentially consists of three main components, a printed circuit board assembly (with connector strip), a housing bottom and a housing cover. The housing bottom and the housing cover in each case have a continuous collar-like edge. The housing bottom and the housing cover rest with these edges against the underside and, respectively, top side of the circuit board in the area of its outer edge. As a result, the circuit board is clamped and fixed in location between the housing bottom and housing cover. To obtain a fixed and reliable connection between the two housing parts and to secure the circuit board in position, these three components are permanently connected to one another in the area of the collar-like edges of the housing parts. This connection can be effected inexpensively and by simple production means by flanging. Such a housing configuration has the disadvantage that a considerable amount of unusable areas are used on the circuit board for supporting the housing parts and their interconnection. The total area of the circuit board is therefore relatively large in comparison with the inner area of the circuit board available for fitting and accommodating circuit components. Since no circuit elements can be arranged in the support areas for the housing parts, such an electrical device requires a relatively large base area compared with the circuit-carrying, that is to say equipped area of the circuit board.

ADVANTAGES OF THE INVENTION

By comparison, the electrical device, particularly switching and control device for motor vehicles according to the invention, having the characterizing features of the main claim, has the advantage that a simple inexpensive housing configuration is made possible, the base area of the electrical device taken up being only slightly larger than the equipped area of the circuit board. The unusable zones on the circuit board which are required for mounting the circuit board in the interior of the housing are minimal. The housing dimensions and the dimensions of the electrical device at the level of the circuit board are only slightly larger than the circuit board area required for equipping and accommodating the circuit.

By constructing one or more housing parts as stamped sheet metal parts or as deep-drawn stamped sheet metal parts, an inexpensive component production which is simple in terms of production engineering is possible.

An inexpensive production or a simple production process which manages without additional mounting parts is obtained especially when the housing parts are connected to one another into the circuit board by means of flanging.

Constructed sections at the housing parts which extend parallel to the circuit board surfaces advantageously result in support areas for the circuit board by means of which a spacing from the remaining housing surfaces is ensured. Thus, no additional spacing elements or fixing elements are required inside the housing. These support areas can be used simultaneously for mounting. It is possible to form these sections either during a machine mounting and flanging process or to preshape these sections directly or in an intermediate step during the shaping of the housing parts.

It is particularly advantageous if the sections of the housing parts which extend parallel to the surface of the circuit board point into the interior of the housing for supporting and mounting the circuit board. This ensures that the outside dimensions of the electrical device are only slightly larger than the corresponding dimensions of the circuit board in the area of the flat circuit board extent. The side walls of the housing can thus extend in the immediate vicinity of the outside edge of the circuit board.

Further advantages and advantageous further developments of the invention are obtained from the subclaims and the description.

DRAWING

An illustrative embodiment of the invention is explained in greater detail in the following description and drawing. The latter shows, in FIG. 1, a view of the electrical device from the underside and a side view in FIG. 2.

FIG. 3 shows a section along III—III according to FIG. 1.

DESCRIPTION OF THE EXEMPLARY EMBODIMENT

Figure 1:
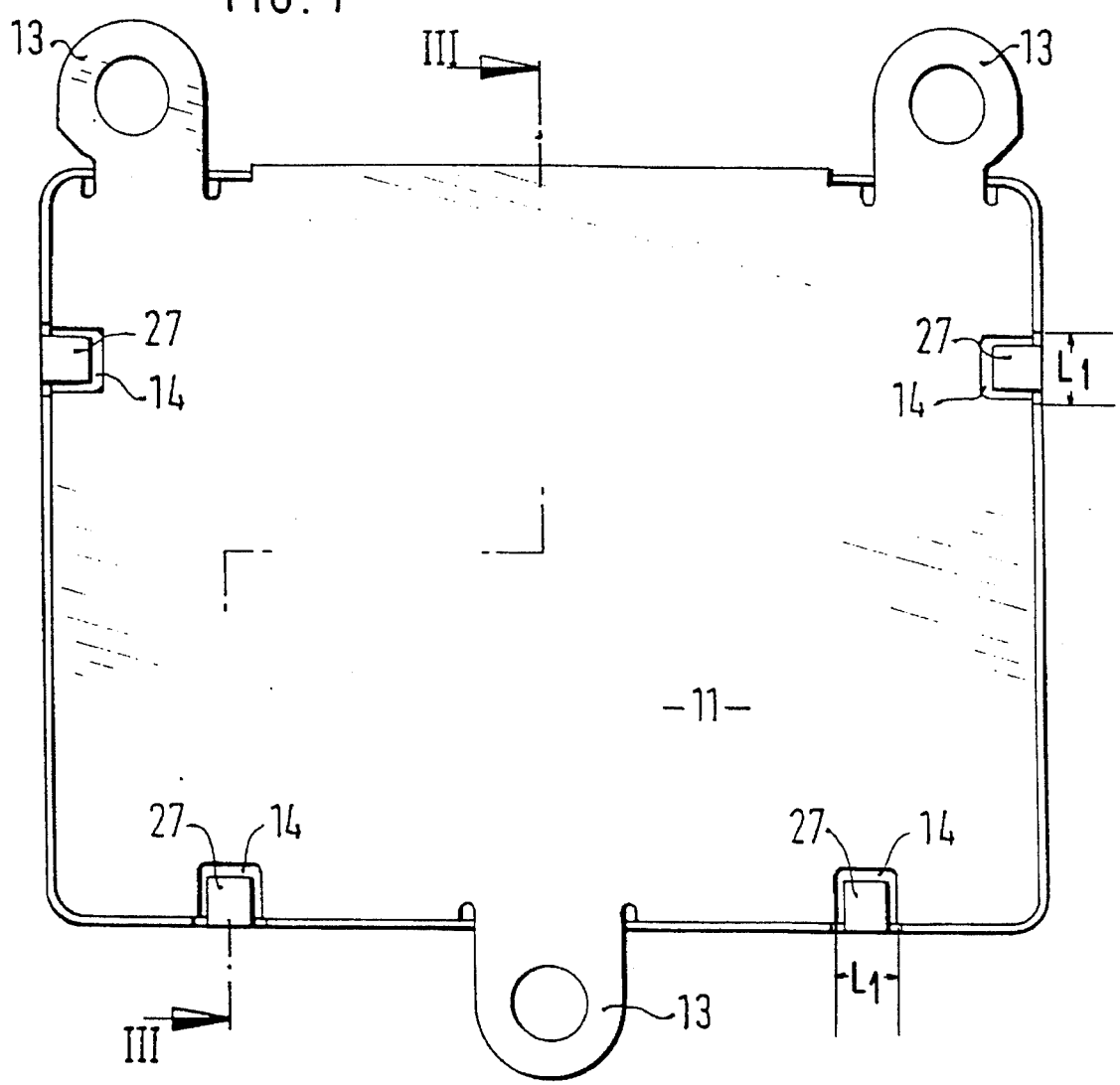
Figure 2:
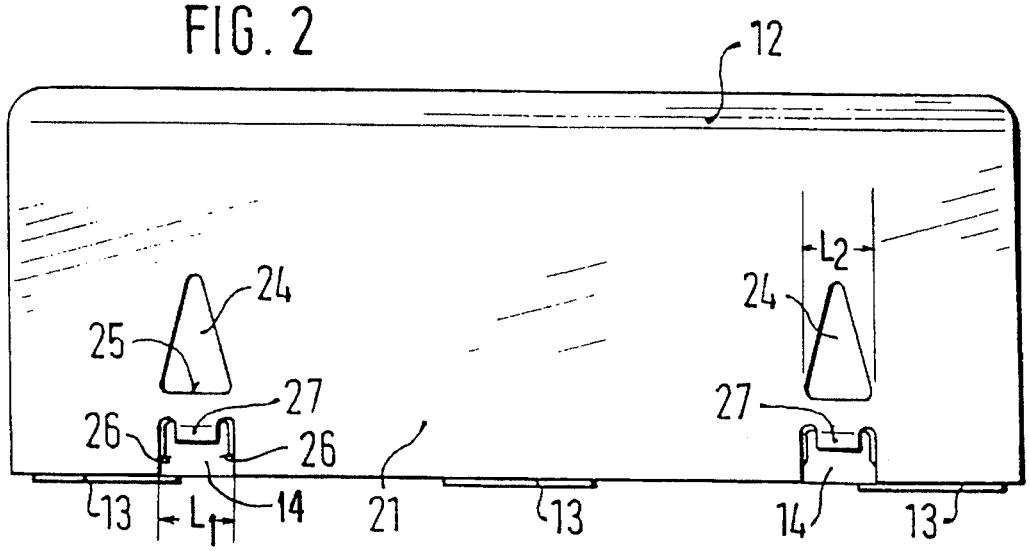
Figure 3:
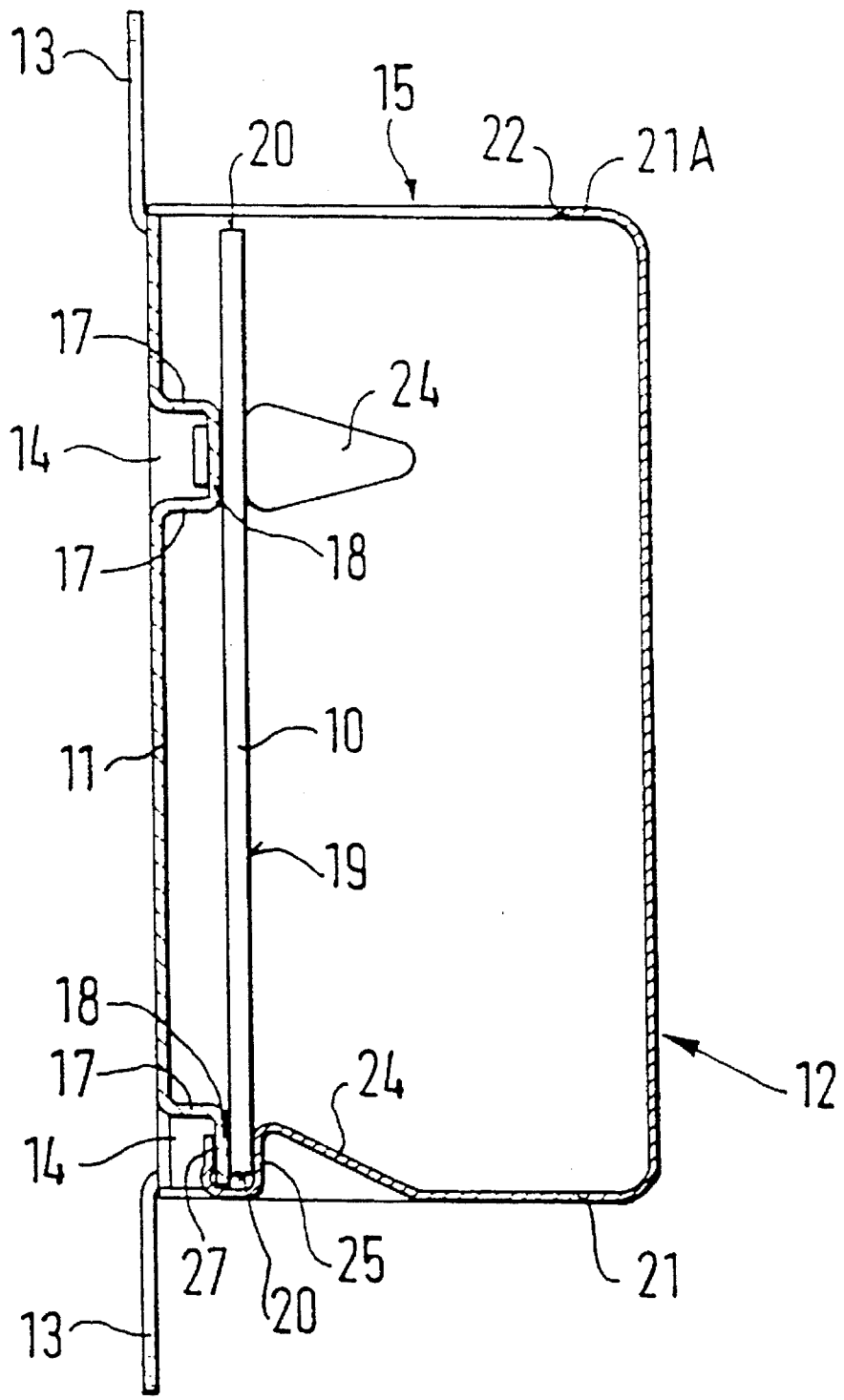

FIGS. 1 to 3 show an electrical device which is essentially composed of three main components, a circuit board 10, a housing bottom 11 and a housing cover 12. The circuit board 10 is a circuit carrier, known per se, and can be constructed as single-layer or two-layer circuit board or as multi-layer circuit board. The circuit board 10 can also be a ceramic substrate or a circuit carrier in hybrid construction. It is also possible to construct the circuit board 10 as a conductor foil which is constructed to be flexurally stiff by suitable means. For this purpose, the conductor foil itself can be flexurally stiff or laminated onto a suitable carrier structure. The circuit board 10 is shown without components in FIG. 3 but carries an electronic circuit with corresponding conductor structures in the finished state of the electrical device. This electronic circuit can also include discrete and/or integrated circuit components. Furthermore, contact with this circuit can be established from the outside via a connector arrangement, not shown, or corresponding electrical connecting means.

In this exemplary embodiment, the housing of housing bottom 11 and housing cover 12 and the circuit board 10 have an essentially rectangular base area. Dimensions (length, width) of the housing bottom 11 are in each case larger by a small amount than the corresponding dimensions of the circuit board 10, but it is also possible to make these dimensions at least approximately equal, circuit board 10 and housing bottom 11 then being approximately coincident. The housing bottom 11 has a number (three in this exemplary embodiment) of mounting tabs 13 which are offset to the bottom and protrude outward, with the aid of which the electrical device can be attached at the location of installation. In addition, a number of support sections 14 for the circuit board 10 are constructed in the housing bottom 11 in the area of its outer edge. These support sections 14 are constructed on three sides of the housing bottom 11 in this exemplary embodiment, the front 15 not exhibiting any support sections. However, it is also possible to construct these support sections on all four edge sides of the housing bottom 11, or also on only two housing sides. However, these should then be advantageously opposite one another.

The housing bottom 11 is constructed as a stamped sheet metal part, the support sections 14 being constructed by a suitable shaping process (for example deep drawing). These support sections 14 form chambers open to the bottom and to the outside of the housing bottom 11, with three side walls 17 and a top 18.

The circuit board 10 is placed onto the housing bottom 11 without protruding past it. For this purpose, the circuit board 10 rests on the tops 18 of the support sections 14 in the area of its outer edge. The flat extent of top 18 and circuit board 10 is at least approximately parallel in this arrangement.

The circuit board 10 is enclosed at its top 19 and its side edges 20 by the cap-like housing cover 12. This housing cover 12 is constructed in such a manner that it contactlessly encloses the circuit components (not shown) of the circuit board 10. In the exemplary embodiment shown here, the side walls 21 of the housing 12 extend at a slight distance from the circuit board 10 and evenly enclose the housing bottom 11. The housing cover 12 rests with its underside on the mounting tabs 13 as a result of which an accurate spatial allocation is possible. It is also possible to construct the housing cover 12 in such a manner that it evenly encloses the circuit board 10, especially when the latter has no constructive elements in the area of its outer edges 20.

The side wall 21a of the housing cover 12, which extends in the area of the front 15, has a housing opening 22 through which the aforementioned line connections or plug-in connecting elements, not shown, protrude.

The housing cover 12 has mounting sections 24 which are bent inward in a wedge form or nose form and are located in the area of the support sections 14 of the housing bottom 11 at its side walls 21. These mounting sections 24 are constructed to be chamber-like and are open towards the outside. They have a lower part 25 which extends approximately parallel to the circuit board surface and rests on the top 19 of the circuit board 10. This lower part 25 of the respective mounting section 24 approximately corresponds in its dimensions to those of the upper part 18 of the opposite support section 14. Underneath the mounting sections 24, a flange section 27 is in each case constructed by two approximately parallel cut-ins 26 coming from the edge of the side wall 21. The distance between the two cut-ins 26 is slightly less than the distance between the two mutually opposite side walls 17 of the respective support section 14.

These cut-ins 26 extend from the edge or, respectively, the underside of the side walls 21 to approximately the height of the upper part 18 of the support section 14. The flange section 27 formed by the two cut-ins 26 is bent inward into the chamber of the support section 14 underneath the upper part 18 and rests against the underside of the upper part 18. Due to this flanging-over, the housing cover 12 and the housing bottom 11 are permanently joined to one another, the circuit board 10 being clamped between two housing parts, that is to say between the mounting section 24 and the support section 14.

The housing cover 12 can also be produced inexpensively as stamped sheet metal part, for example by means of a deep drawing process. The mounting sections 24 can be preshaped in an intermediate step before the housing cover 12 is actively joined to the housing bottom 11. However, it is also possible to insert or construct the mounting sections only when the actual joint is produced (during the flanging in this exemplary embodiment).

Instead of the flange connection in the area of the mounting sections 24 and, respectively, support sections 14, housing bottom 11, housing cover 12 and circuit board 10 can also be joined by other suitable connecting techniques or connecting means such as bonding, soldering, by means of screws or rivets, by locking elements or clamping or spring elements or others. Using the flange connection, however, has the advantage that the flange section 27 can be preshaped during the shaping process of the housing cover 12 and that no additional mounting elements are needed, either.

The dimensions of the support sections 14 and of the opposite mounting sections 24 are very much smaller than the corresponding edge dimensions of the circuit board 10, that is to say only a very small section of the circuit board edge is needed for the support and the mounting in comparison with the respective side length of the circuit board 10. The width of the mounting sections 24 and support sections 14 is essentially predetermined by the shaping tools and is almost independent of the corresponding length of the circuit board edge.

In the dimensions of the electrical device, which are only qualitatively reproduced in FIGS. 1 to 3, the edge dimensions in the area of the mounting sections 24 and support sections 14 respectively are less than 10% of the total length of the respective circuit board edge. In comparison with the circuit board size, shown qualitatively here, only approximately 2% of the circuit board surface is needed for the joining and support.

We claim:

1. An electrical device for vehicles, comprising at least one circuit board carrying an electronic circuit and having an edge of a predetermined total edge length; a housing in which said circuit board is arranged and which includes a housing cover part and a housing bottom part; and joining means which join said housing cover part, said housing bottom part and said circuit board with one another, said joining means including individual joints arranged at an edge of said circuit board, said joints having a length which is measured along said edge of said circuit board and is substantially smaller than said total edge length of said circuit board.

2. An electrical device as defined in claim 1, wherein said joining means is formed as flanged-over sections of at least one of said housing parts.

3. An electrical device for vehicles, comprising at least one circuit board carrying an electronic circuit; a housing in which said circuit board is arranged and which includes a housing cover part and a housing bottom part; and joining means which permanently join said housing cover part, said housing bottom part and said circuit board with one another, said joining means including individual joints arranged at an edge of said circuit board, said joints having an edge length which is small in comparison with a total edge length of said circuit board, at least one of said housing parts being formed as a deep-drawn stamped sheet metal part.

4. An electrical device for vehicles, comprising at least one circuit board carrying an electronic circuit; a housing in which said circuit board is arranged and which includes a housing cover part and a housing bottom part; and joining means which permanently join said housing cover part, said housing bottom part and said circuit board with one another, said joining means including individual joints arranged at an edge of said circuit board, said joints having an edge length which is small in comparison with a total edge length of said circuit board, at least one of said housing cover part and said housing bottom part and said circuit board being provided at least in an area of said joining means with parallel extending sections at which said housing parts and said circuit board rest on one another.

5. An electrical device as defined in claim 4, wherein said parallel extending sections of at least one of said housing cover part and said housing bottom part are formed as bent away edge areas of a corresponding one of said housing parts.

6. An electrical device as defined in claim 5, wherein said bent away edge areas protrude toward an interior of said housing.

7. An electrical device as defined in claim 4, wherein said parallel extending sections of both of said housing cover part and said housing bottom part are formed as bent away edge areas of a corresponding one of said housing parts.

8. An electrical device as defined in claim 7, wherein said bent away edge areas protrude toward an interior of said housing.

9. An electrical device for vehicles, comprising at least one circuit board carrying an electronic circuit; a housing in which said circuit board is arranged and which includes a housing cover part and a housing bottom part; and joining means which permanently join said housing cover part, said housing bottom part and said circuit board with one another, said joining means including individual joints arranged at an edge of said circuit board, said joints having an edge length which is small in comparison with a total edge length of said circuit board, at least one of said housing bottom part and said housing cover part being provided with mounting sections which are open toward an outer side in an area of said joints.

10. An electrical device for vehicles, comprising at least one circuit board carrying an electronic circuit; a housing in which said circuit board is arranged and which includes a housing cover part and a housing bottom part; and joining means which permanently join said housing cover part, said housing bottom part and said circuit board with one another, said joining means including individual joints arranged at an edge of said circuit board, said joints having an edge length which is small in comparison with a total edge length of said circuit board, both of said housing bottom part and said housing cover part being provided with mounting sections which are open toward an outer side in an area of said joints.

11. An electrical device for vehicles, comprising at least one circuit board carrying an electronic circuit; a housing in which said circuit board is arranged and which includes a housing cover part and a housing bottom part; and joining means which permanently join said housing cover part, said housing bottom part and said circuit board with one another, said joining means including individual joints arranged at an edge of said circuit board, said joints having an edge length which is small in comparison with a total edge length of said circuit board, at least one of said housing bottom part and said housing cover part being provided with support sections which are open toward an outside in an area of said joints.

12. An electrical device for vehicles, comprising at least one circuit board carrying an electronic circuit; a housing in which said circuit board is arranged and which includes a housing cover part and a housing bottom part; and joining means which permanently join said housing cover part, said housing bottom part and said circuit board with one another, said joining means including individual joints arranged at an edge of said circuit board, said joints having an edge length which is small in comparison with a total edge length of said circuit board, both of said housing bottom part and said housing cover part being provided with support sections which are open toward an outside in an area of said joints.

\* \* \* \* \*